US010635356B2

(12) United States Patent
 Ngu et al.

(10) Patent No.: US 10,635,356 B2
(45) Date of Patent: Apr. 28, 2020

(54) DATA MANAGEMENT METHOD AND STORAGE CONTROLLER USING THE SAME

(71) Applicant: Shenzhen EpoStar Electronics Limited CO., Shenzhen (CN)

(72) Inventors: Di-Hsien Ngu, Hsinchu County (TW); Ke-Wei Chan, Hsinchu (TW); Hung-Chih Hsieh, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/192,826

(22) Filed: Nov. 16, 2018

(65) Prior Publication Data
 US 2020/0104072 A1  Apr. 2, 2020

(30) Foreign Application Priority Data
 Oct. 1, 2018 (TW) .............................. 107134658 A (51) Int. Cl.
 *G06F 3/06* (2006.01)
 *G06F 12/00* (2006.01)

(52) U.S. Cl.
 CPC .......... *G06F 3/0659* (2013.01); *G06F 3/0604* (2013.01); *G06F 3/0673* (2013.01)

(58) Field of Classification Search
 CPC ...... G06F 12/00; G06F 3/0659; G06F 3/0604; G06F 3/0673; G06F 13/00
 USPC ................................ 711/100, 154, 155, 200
 See application file for complete search history.

(56) References Cited

U.S. PATENT DOCUMENTS

| 5,379,379 | A | * | 1/1995 | Becker ................ G06F 13/1631 |
| | | | | 711/158 |
| 5,459,842 | A | | 10/1995 | Begun et al. |
| 5,659,720 | A | | 8/1997 | Fiacco et al. |
| 5,717,394 | A | * | 2/1998 | Schwartz ............ H03M 7/4006 |
| | | | | 341/107 |

(Continued)

FOREIGN PATENT DOCUMENTS

| EP | 0475729 | 3/1996 |
| WO | 9634329 | 10/1996 |

OTHER PUBLICATIONS

"Office Action of Taiwan Counterpart Application," dated Apr. 17, 2019, p. 1-p. 3.

*Primary Examiner* — Tuan V Thai
(74) *Attorney, Agent, or Firm* — JCIPRNET (57) ABSTRACT

A data management method and a storage controller are provided. The method includes: receiving write sectors corresponding to a write command and transmitting the write sectors to a partial block buffer or a full block buffer; when the write sectors corresponding to a first block are transmitted to the partial block buffer, starting a timer corresponding to the first block; when the partial block buffer receives first write sectors corresponding to the first block and the first write sectors and the write sectors corresponding to the first block in the partial block buffer form a full first block, the first block is transmitted to the full block buffer before or when the timer is expired; and when the timer is expired and the full first block is not yet formed in the partial block buffer, performing a read-modify-write operation according to the write sectors corresponding to the first block.

22 Claims, 10 Drawing Sheets

(56) References Cited

U.S. PATENT DOCUMENTS

| | | |
|---|---|---|
| 6,718,444 B1 | 4/2004 | Hughes |
| 6,879,341 B1 | 4/2005 | Silverbrook |
| 2003/0110344 A1* | 6/2003 | Szczepanek ...... H04L 12/40013 |
| | | 711/100 |
| 2004/0143710 A1* | 7/2004 | Walmsley ............ B41J 2/04505 |
| | | 711/144 |
| 2006/0143454 A1* | 6/2006 | Walmsley ................ G06F 21/85 |
| | | 713/170 |
| 2015/0121021 A1 | 4/2015 | Nakamura et al. |

* cited by examiner

|  | SLBA | ELBA |
|---|---|---|
| W1 | 8 | 14 |
| W2 | 15 | 23 |

| | W2 | | | | | | | | W1 | | | | | | |
|---|---|---|---|---|---|---|---|---|---|---|---|---|---|---|---|
| LBA | 23 | 22 | 21 | 20 | 19 | 18 | 17 | 16 | 15 | 14 | 13 | 12 | 11 | 10 | 9 | 8 |
| BN | 2 | 2 | 2 | 2 | 2 | 2 | 2 | 2 | 1 | 1 | 1 | 1 | 1 | 1 | 1 | 1 |
| SN | 7 | 6 | 5 | 4 | 3 | 2 | 1 | 0 | 7 | 6 | 5 | 4 | 3 | 2 | 1 | 0 |
| FBI | 1 | 1 | 1 | 1 | 1 | 1 | 1 | 1 | 0 | 0 | 0 | 0 | 0 | 0 | 0 | 0 |

|  | SLBA | ELBA |
|---|---|---|
| W1 | 39 | 58 |
| W2 | 54 | 63 |

W2:

| LBA | 54 | 55 | 56 | 57 | 58 | 59 | 60 | 61 | 62 | 63 |
|---|---|---|---|---|---|---|---|---|---|---|
| BN | 6 | 6 | 7 | 7 | 7 | 7 | 7 | 7 | 7 | 7 |
| SN | 6 | 7 | 0 | 1 | 2 | 3 | 4 | 5 | 6 | 7 |
| FBI | 0 | 0 | 1 | 1 | 1 | 1 | 1 | 1 | 1 | 1 |

W1:

| LBA | 39 | 40 | 41 | 42 | 43 | 44 | 45 | 46 | 47 | 48 | 49 | 50 | 51 | 52 | 53 | 54 | 55 | 56 | 57 | 58 |
|---|---|---|---|---|---|---|---|---|---|---|---|---|---|---|---|---|---|---|---|---|
| BN | 4 | 5 | 5 | 5 | 5 | 5 | 5 | 5 | 5 | 6 | 6 | 6 | 6 | 6 | 6 | 6 | 6 | 7 | 7 | 7 |
| SN | 7 | 0 | 1 | 2 | 3 | 4 | 5 | 6 | 7 | 0 | 1 | 2 | 3 | 4 | 5 | 6 | 7 | 0 | 1 | 2 |
| FBI | 0 | 1 | 1 | 1 | 1 | 1 | 1 | 1 | 1 | 1 | 1 | 1 | 1 | 1 | 1 | 1 | 1 | 0 | 0 | 0 |

DATA MANAGEMENT METHOD AND STORAGE CONTROLLER USING THE SAME

CROSS-REFERENCE TO RELATED APPLICATION

This application claims the priority benefit of Taiwan application serial no. 107134658, filed on Oct. 1, 2018. The entirety of the above-mentioned patent application is hereby incorporated by reference herein and made a part of this specification.

BACKGROUND

Technical Field

The disclosure relates to a data processing method and a storage controller using the method, and more particularly, relates to a data processing method and a storage controller using the method, which are capable of reducing the number of times a read-modify-write (RMW) operation is executed.

Description of Related Art

For storage devices, an internal data buffer is commonly used in a storage controller to regulate a data transmission between a host system and a storage medium. A unit size of the internal data buffer (e.g., a block size) is normally a multiple of a host logic block size, which is based on a host interface protocol and utilizable by a file system. In other words, there is a mapping relation between a host logic block address (LBA) and an internal block address. For instance, the host logic block size may be 512 B and the unit size of the internal buffer may be 4 KB (e.g., one unit corresponding to one block and one block includes 8 sectors each with the size of 512 B).

For a host Input/output write command transmission, it is possible that the first few host logic blocks or the last few host logic blocks are unable to form one full internal block in a storage system. In the storage system that uses the block size as a logical-to-physical mapping table, a read-modify-write operation is needed for this kind of partial block writing. However, the read-modify-write operation would consume a lot of system resources and reduces system performance. In addition, for certain storage media (e.g., NAND flash memories), the read-modify-write operation would also reduce the life of the storage media. Therefore, how to reduce the number of times the read-modify-write operation is executed in the storage device is a problem to be solved by persons skilled in the art.

Nothing herein should be construed as an admission of knowledge in the prior art of any portion of the disclosure. Furthermore, citation or identification of any document in this application is not an admission that such document is available as prior art to the disclosure, or that any reference forms a part of the common general knowledge in the art.

SUMMARY

The disclosure provides a data processing method and a storage controller using the method, which are capable of reducing the number of times the read-modify-write operation is executed.

The disclosure proposes a data processing method adapted for a storage controller. The storage controller is configured to access a storage medium and coupled to a host system. The data processing method includes: receiving write sectors corresponding to a write command and transmitting the write sectors to a partial block buffer or a full block buffer, wherein the write sectors correspond to at least one block; when the write sectors corresponding to a first block are transmitted to the partial block buffer, starting a timer corresponding to the first block; when the partial block buffer receives at least one first write sector corresponding to the first block and the at least one first write sector and the write sectors corresponding to the first block in the partial block buffer form the full first block, the first block is transmitted to the full block buffer from the partial block buffer before the timer is expired or when the timer is expired; and when the timer is expired and the full first block is not yet formed in the partial block buffer, performing a read-modify-write operation according to the write sectors corresponding to the first block.

In an embodiment of the disclosure, when the full block buffer receives the write sectors corresponding to a second block, the write sectors corresponding to the second block in the partial block buffer are invalidated.

In an embodiment of the disclosure, when the full block buffer receives the write sectors corresponding to a second block, the read-modify-write operation corresponding to the second block is invalidated.

In an embodiment of the disclosure, when the write sectors are able to form a full block, the write sectors are transmitted to the full block buffer; and when the write sectors are unable to form the full block, the write sectors are transmitted to the partial block buffer.

In an embodiment of the disclosure, the read-modify-write operation includes obtaining at least one read sector from the storage medium, and transmitting the write sectors corresponding to the first block and the at least one read sector to the full block buffer.

In an embodiment of the disclosure, when the at least one write sector and the write sectors corresponding to the first block in the partial block buffer form the full first block, the timer is reset.

In an embodiment of the disclosure, when the timer is expired and the read-modify-write operation is performed according to the write sectors corresponding to the first block, the timer is reset.

In an embodiment of the disclosure, when the storage controller supports a plurality of logic block address sizes, a block size is equal to a common multiple of the logic block address sizes and a sector size is a common factor of the logic block address sizes.

In an embodiment of the disclosure, each of the full block buffer and the partial block buffer includes a plurality of entries, a capacity of each of the entries is equal to a block size, and each of the entries of the partial block buffer corresponds to one said timer.

In an embodiment of the disclosure, when the write sectors are unable to form a full block and each of the entries of the partial block buffer has valid data, a first entry among the entries of the partial block buffer with the timer closest to being expired is selected for performing the read-modify-write operation and the first entry is invalidated.

In an embodiment of the disclosure, when the full first block is formed before the timer is expired and a second write sector corresponding to the first block is received by the partial block buffer before the timer is expired, the second write sector is overwritten to the full first block in the partial block buffer.

The disclosure provides a storage controller, which is configured to access a storage medium and coupled to a host system. The storage controller includes: a partial block buffer; a full block buffer; a write data router, coupled to the partial block buffer and the full block buffer; and a processor, coupled to the write data router, the partial block buffer and the full block buffer. The write data router receives a plurality of write sectors corresponding to a write command and transmits the write sectors to a partial block buffer or a full block buffer, wherein the write sectors correspond to at least one block. When the write sectors corresponding to a first block are transmitted to the partial block buffer, the processor starts a timer corresponding to the first block. When the partial block buffer receives at least one first write sector corresponding to the first block and the at least one first write sector and the write sectors corresponding to the first block in the partial block buffer form the full first block, the first block is transmitted to the full block buffer from the partial block buffer before the timer is expired or when the timer is expired. When the timer is expired and the full first block is not yet formed in the partial block buffer, the processor performs a read-modify-write operation according to the write sectors corresponding to the first block.

In an embodiment of the disclosure, when the full block buffer receives the write sectors corresponding to a second block, the write sectors corresponding to the second block in the partial block buffer are invalidated.

In an embodiment of the disclosure, when full block buffer receives the write sectors corresponding to a second block, the read-modify-write operation corresponding to the second block is invalidated.

In an embodiment of the disclosure, when the write sectors are able to form a full block, the write sectors are transmitted to the full block buffer; and when the write sectors are unable to form the full block, the write sectors are transmitted to the partial block buffer.

In an embodiment of the disclosure, the read-modify-write operation includes obtaining at least one read sector from the storage medium, and transmitting the write sectors corresponding to the first block and the at least one read sector to the full block buffer.

In an embodiment of the disclosure, when the at least one write sector and the write sectors corresponding to the first block in the partial block buffer form the full first block, the timer is reset.

In an embodiment of the disclosure, when the timer is expired and the read-modify-write operation is performed according to the write sectors corresponding to the first block, the timer is reset.

In an embodiment of the disclosure, when the storage controller supports a plurality of logic block address sizes, a block size is equal to a common multiple of the logic block address sizes and a sector size is a common factor of the logic block address sizes.

In an embodiment of the disclosure, each of the full block buffer and the partial block buffer includes a plurality of entries, a capacity of each of the entries is equal to a block size, and each of the entries of the partial block buffer corresponds to one said timer.

In an embodiment of the disclosure, when the write sectors are unable to form a full block and each of the entries of the partial block buffer has valid data, the processor selects a first entry among the entries of the partial block buffer with the timer closest to being expired for performing the read-modify-write operation and invalidates the first entry.

In an embodiment of the disclosure, when the full first block is formed before the timer is expired and a second write sector corresponding to the first block is received by the partial block buffer before the timer is expired, the processor overwrites the second write sector to the full first block in the partial block buffer.

Based on the above, the data processing method and the storage controller using the method described in the disclosure can transmit the write sectors unable to form the full block to the partial block buffer, and can transmit the write sectors able to form the full block to the full block buffer. When the partial block is transmitted to the partial block buffer, the timer is started. When empty sectors in the entry corresponding to one block in the partial block buffer are filled before the timer is expired, the processor transmits the filled block to the full block buffer. When the entry corresponding to one block in the partial block buffer is not filled when the timer is expired, the processor performs the read-modify-write operation on the not-filled block. With the data processing method and the storage controller using the method described in the disclosure, the number of times the read-modify-write operation is executed may be effectively reduced, so as to save system resources and improve system performance.

To make the above features and advantages of the disclosure more comprehensible, several embodiments accompanied with drawings are described in detail as follows.

It should be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6A to FIG. 6C illustrate another example of a data processing method according to an embodiment of the disclosure.

DESCRIPTION OF THE EMBODIMENTS

Reference will now be made in detail to the preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
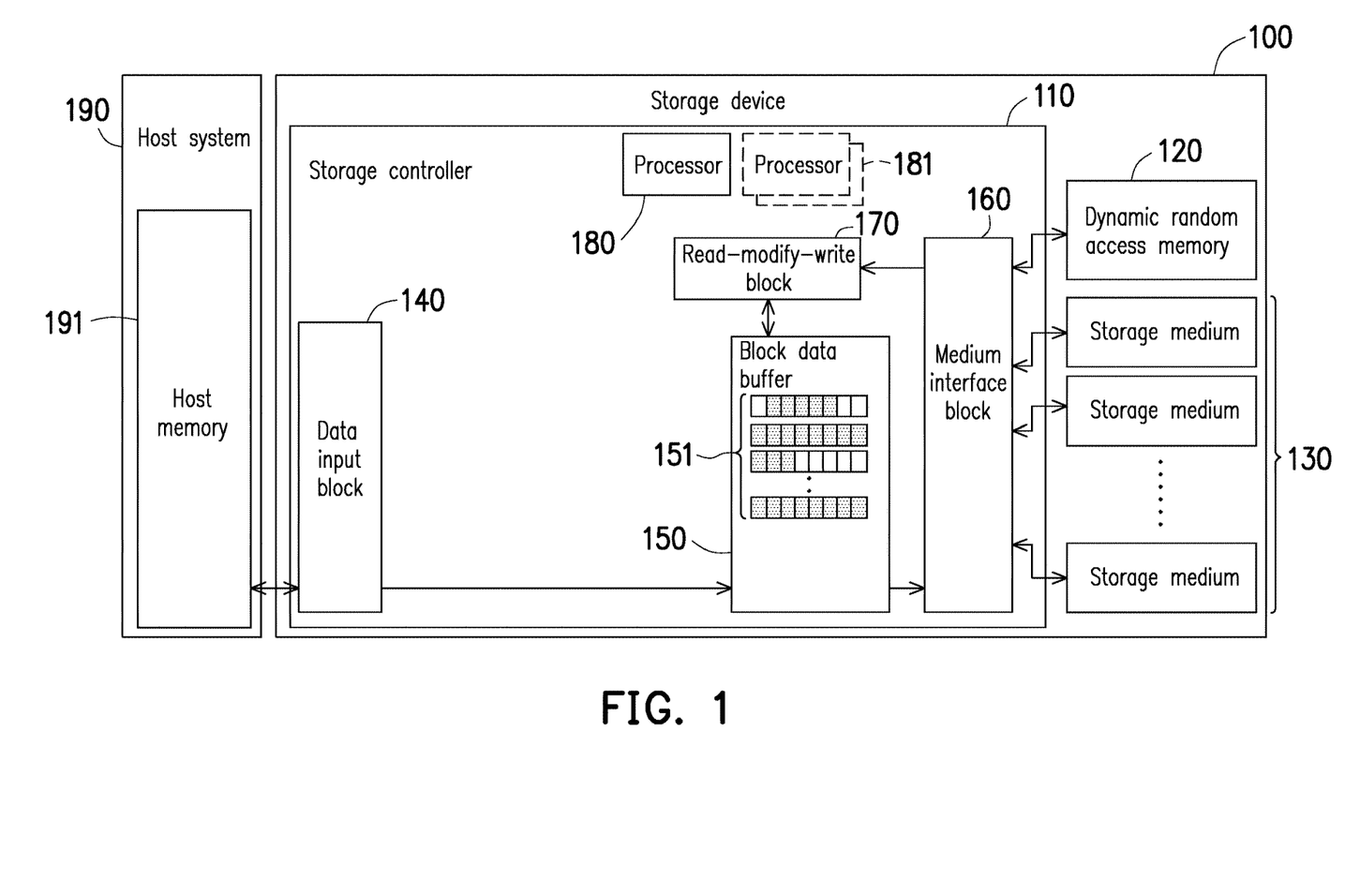
FIG. 1 is a block diagram of a storage controller according to an embodiment of the disclosure.

FIG. 1 is a block diagram of a storage controller according to an embodiment of the disclosure.

With reference to FIG. 1, a storage device 100 of the disclosure includes a storage controller 110, a dynamic random access memory (DRAM) 120 and a plurality of storage media 130. A data input block 140 of the storage controller 110 may receive write data from a host memory 191 of a host system 190. The write data may be transmitted to a block data buffer 150. The block data buffer 150 may include a plurality of entries 151, and each of the entries can store full block data or non-full block data. The full block data include all of sector data corresponding to one block. The non-full block data include a part of sector data corresponding to one block. When one entry is stored with the full block data, the block data of that entry may be transmitted to a medium interface block 160 and written into the storage medium 130. When one entry is stored with the non-full block data, the non-full block data is transmitted to a read-modify-write block 170, returned to the block data buffer 150 after the block is filled up by using one or more sectors in the storage medium 130, and eventually written back to the storage medium 130 through the medium interface block 160. The storage medium 130 may be a rewritable non-volatile memory module. A processor 180 is responsible for processing I/O commands of the host system 190. In addition to the processor 180, the storage controller 110 may further include one or more processors 181 responsible for processing commands other than the host I/O commands.

In this embodiment, whenever one of the entries 151 receives the non-full block data, the processor 180 or the processor 181 have to perform one read-modify-write operation. This would consume a lot of system resources and reduce system performance.

Figure 2:
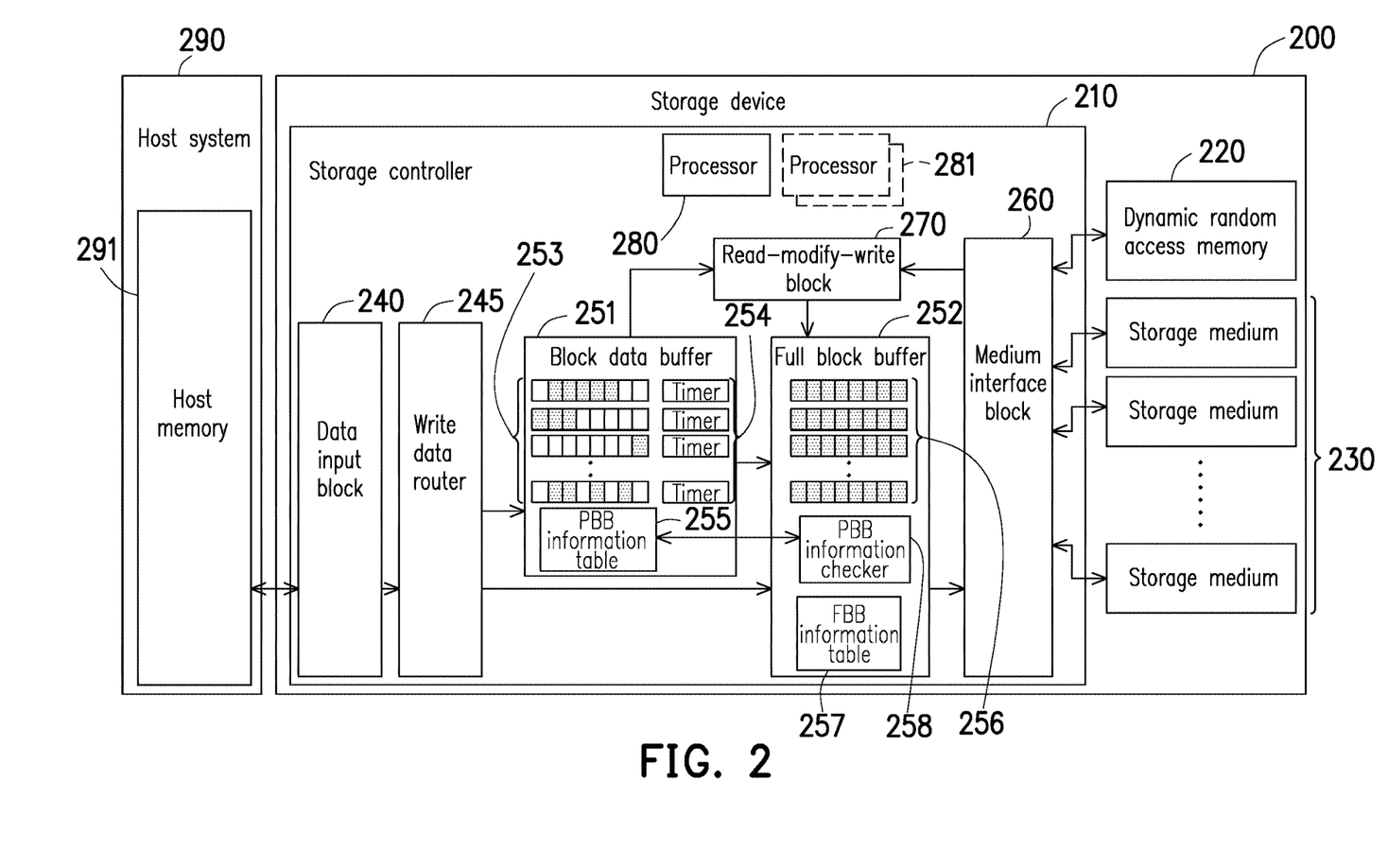
FIG. 2 is a block diagram of a storage controller according another embodiment of the disclosure.

FIG. 2 is a block diagram of a storage controller according another embodiment of the disclosure.

With reference to FIG. 2, functions of the same or similar components in FIG. 2 and FIG. 1 are not repeated hereinafter.

When receiving a plurality of write sectors corresponding to one write command (or, also known as write data corresponding to the write sectors), a data input block 240 assigns one block number (BN), one sector number (SN) and one full block indicator (FBI) for each of the write sectors according to write command information. In an embodiment, the write sectors having the same block number can have continuous sector numbers, and FBI is configured to indicate whether one write sector is able to form one full block together with the write sectors having neighboring sector numbers in the same write command. For example, the write sector with FBI being 1 represents that this write sector is able to from one full block together with the write sectors having neighboring sector numbers in the same write command, and the write sector with FBI being 0 represents that the write sector is unable to form one full block together with the write sectors having neighboring sector numbers in the same write command.

After the write sectors corresponding to the write command are transmitted to a write data router 245, the write data router 245 transmits the write sectors to a partial block buffer 251 or a full block buffer 252 according to FBI of each of the write sectors. For example, the write sectors with FBI being 0 are transmitted to the partial block buffer (PBB) 251 and the write sectors with FBI being 1 are transmitted to the full block buffer 252.

The partial block buffer 251 may include one or more entries 253. In an embodiment, a capacity of each entry is equal to a block size and a capacity of each unit included in each entry is equal to a sector size. Each of the entries 253 may be correspondingly disposed with one timer 254.

The partial block buffer 251 may further include a partial block buffer information table (PBB information table; PIT) 255, which records block number (BN), sector valid bit (SVB), occupy bit (OB) and valid bit (VB) for each of the entries 253. BN represents the corresponding block number of one entry 253. SVB represents whether one unit in one entry 253 is stored with valid data corresponding to the write sector. OB represents whether one entry 253 is currently being used. VB represents whether one entry 253 is still able to receive write sector data from the write data router 245.

When the partial block buffer 251 receives a transmission request of the write sector from the write data router 245, the partial block buffer 251 checks the partial block buffer information table 255. When one of the entries 253 in the partial block buffer 251 has OB=1 and VB=1 and BN of that entry 253 is identical to BN of the received write sector, such write sector is written into one unit of said entry 253 and SVB of that unit is updated to 1. When none of the entries 253 in the partial block buffer 251 can satisfy OB=1 and VB=1 and BN of that entry is identical to BN of the received write sector, the partial block buffer 251 selects one of the entries 253 with OB=0, sets OB and VB of that entry to 1, starts the timer 254 corresponding to that entry 253, updates BN and SVB according to the sector data, and writes the sector into the entry 253.

When all the units of one entry 253 have SVB=1 and the full block buffer 252 is ready to receive the data of such entry 253, the timer 254 corresponding to such entry 253 is reset, VB is set to 0, and transmission of entry data to the full block buffer 252 is started. After transmission of the entry data is completed, OB and SVB of such entry 253 are set to 0.

When the timer 254 corresponding to one entry 253 is expired and a read-modify-write block 270 is ready to process the data of such entry 253, the timer 254 corresponding to that entry 253 is reset, VB is set to 0, and transmission of partial block data of the entry 253 to the read-modify-write block 270 is started. After transmission of the partial block data is completed, OB and SVB of such entry are set to 0.

The full block buffer 252 may include a full block buffer information table (FBB information table; FIT) 257 and a partial block buffer information checker (PBB information checker; PIC) 258. The full block buffer 252 may include one or more entries 256 and a size of each entry 256 is equal to the block size. The full block buffer information table 257 records BN, SVB, OB and VB for each of the entries 256, as similar to the partial block buffer information table 255.

When the full block buffer 252 receives the transmission request of the write sector from the write data router 245, the full block buffer 252 checks the full block buffer information table 257. When one of the entries 256 in the full block buffer 252 has OB=1 and VB=1 and BN of that entry 256 is identical to BN of the received write sector, such write sector is written into one unit of said entry 256 and SVB of said unit is updated to 1. When none of the entries 256 in the full block buffer 252 can satisfy OB=1 and VB=1 and BN of that entry is identical to BN of the received write sector, the full block buffer 252 selects one of the entries 256 with OB=0, sets OB and VB of that entry 256 to 1, updates BN and SVB according to the sector data, and writes the sector into the entry 256.

It should be noted that, when the write sectors generate one full block in the full block buffer 252 (i.e., when each SVB in one entry 256 is updated from 0 to 1), the full block buffer 252 notifies the read-modify-write block 270 to invalidate the read-modify-write operation on the sectors with the same block number as said full block. In addition, the full block buffer 252 also starts the partial block buffer information checker 258 to scan the partial block buffer information table 255 in the partial block buffer 251, so as to determine whether there is any entry 253 with OB=1 and VB=1 having BN identical to BN of the full block. If the entry 253 that satisfies the above condition is found, such entry 253 is invalidated, and OB, SVB and VB of such entry 253 are all set to 0.

When receiving a transmission request of full block data from the partial block buffer 251, the full block buffer 252 selects one entry 256 with OB=0, sets OB and VB to 1, updates BN and SVB (to 1) according to block information, and writes the full block into such entry 256. Meanwhile, the read-modify-write block 270 is notified to invalidate the read-modify-write operation on the sectors with the same block number as said full block.

When receiving the transmission request of the full block data from the read-modify-write block 270, the full block buffer 252 selects one entry 256 with OB=0, sets OB and VB to 1, updates BN and SVB (to 1) according to block information, and writes the full block into such entry 256. The read-modify-write block 270 merges the partial block data from the partial block buffer 251 and the partial block data from the medium interface block 260 into one full block, and transmits the merged full block to the full block buffer 252.

In an embodiment, the medium interface block 260 receives the full block data from the full block buffer 252, and writes the full block data into the storage medium 230 by converting block-based data into data with a format of media accessing protocol. The medium interface block 260 also transmits read data to the read-modify-write block 270 for the read-modify-write operation by converting the data with the format of media accessing protocol into the block-based data.

When the medium interface block 260 is ready to process the entry data of one entry 256 in the full block buffer 252, the full block buffer 252 sets VB to 0, starts to transmit full block entry data to the medium interface block 260, and sets OB and SVB to 0 when the data transmission is completed.

In an embodiment, a logic block defined by a host system 290 may be divided into one or more sectors. In other words, a sector size may be identical to a logic block size or an integer divisor of the logic block size. In the case where the storage device 200 can support various logic block sizes, if the storage device 200 uses only one set of the partial block buffer 251 and the full block buffer 252, a common factor (e.g., a maximum common factor) of the logic block sizes may be selected as the sector size; and if the storage device 200 uses multiple sets of the partial block buffer 251 and the full block buffer 252, each set of the partial block buffer 251 and the full block buffer 252 may be defined with a different sector size.

In an embodiment, the block size may be defined to be identical to or different from an access unit size of the storage medium 230. In the case where the storage device 200 can support various logic block sizes, if the storage device 200 uses only one set of the partial block buffer 251 and the full block buffer 252, a common multiple (e.g., a least common multiple) of the logic block sizes may be selected as the block size; and if the storage device 200 uses multiple sets of the partial block buffer 251 and the full block buffer 252, each set of the partial block buffer 251 and the full block buffer 252 may be defined with a different block size.

In an embodiment, input/output commands sent by the host system 290 and the corresponding data transmissions may be achieved by a host interface protocol. The host interface protocol may be, for example, Non-Volatile Memory Express (NVMe), ATA (Serial Advanced Technology Attachment; SATA), Universal Serial Bus (USB), Small Computer System Interface (SCSI) or other protocols.

It should be noted that, when the write data router 245 intends to transmit the partial block data to the partial block buffer 251 but none of the entries 253 in the partial block buffer 251 can satisfy OB=1 and VB=1 and BN of that entry 253 is identical to BN of the received write sector and the partial block buffer 251 does not have the entry 253 with OB=0, the storage controller 210 can select one entry 253 with OB=1 for the read-modify-write operation according to a predetermined rule, or directly suspend transmission of the partial block data until the entry 253 with OB=0 appears. In an embodiment, the predetermined rule may be: selecting the entry 253 with the timer closest to being expired for the read-modify-write operation. When the write data router 245 intends to transmit the full block data to the full block buffer 252 but the full block buffer 252 does not have the entry 256 with OB=0, the write data router 245 can suspend transmission of the full block data until the entry 256 with OB=0 appears.

In an embodiment, the write data router 245, the partial block buffer information table 255, the full block buffer information table 257, the partial block buffer information checker 258 may be implemented in form of firmware or hard circuits. The disclosure is not limited to the implementation of the above components.

Figure 3A:
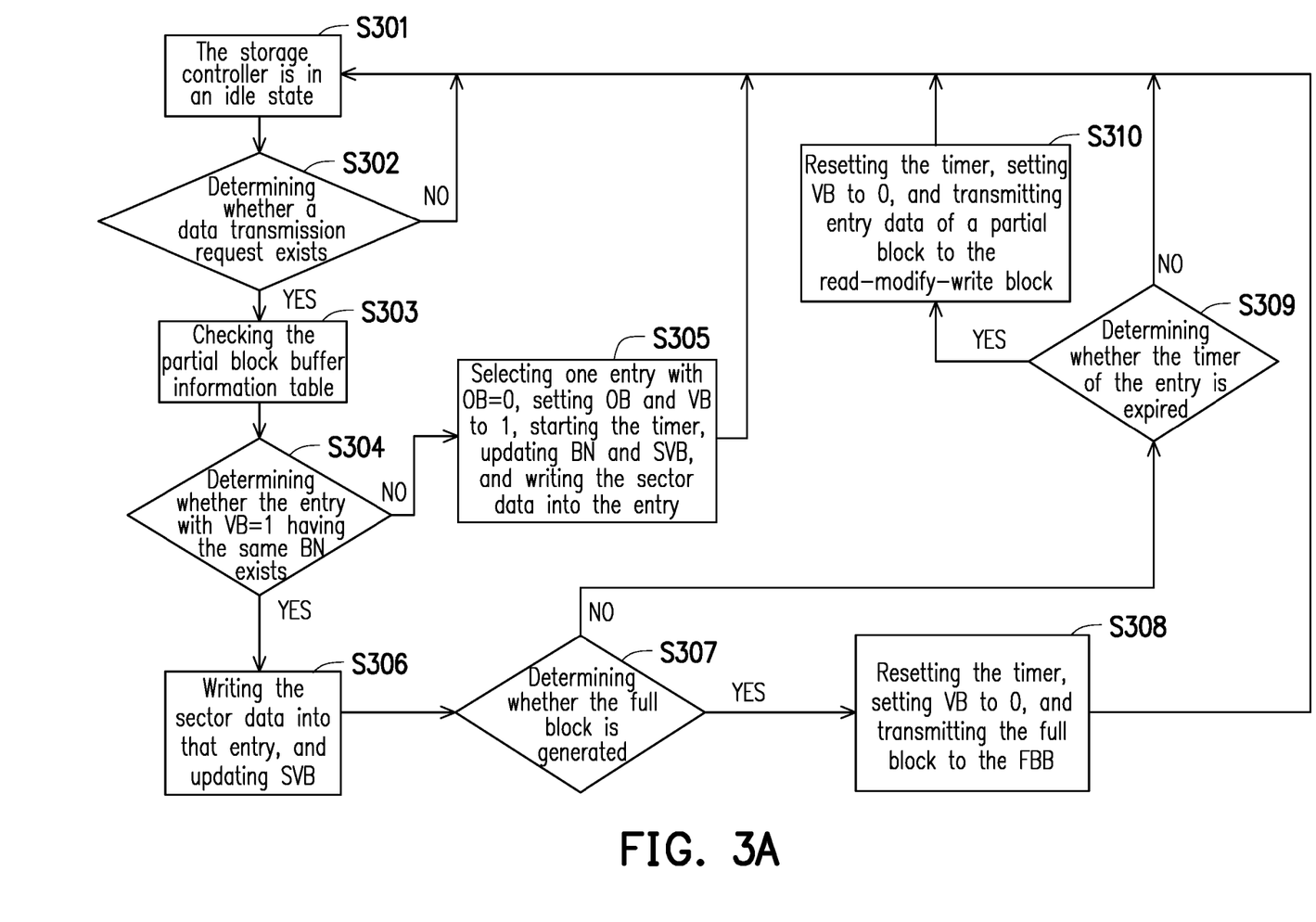
FIG. 3A is a flowchart of a processing flow of a partial block buffer according to an embodiment of the disclosure.

FIG. 3A is a flowchart of a processing flow of a partial block buffer according to an embodiment of the disclosure.

In step S301, the storage controller is in an idle state.

In step S302, whether a data transmission request exists is determined.

If the data transmission request does not exist, the processing flow returns to step S301. If the data transmission request exists, in step S303, the partial block buffer information is checked.

In step S304, whether the entry with VB=1 having the same BN exists is determined. Specifically, whether PBB entry with VB=1 having the same BN of the write sectors corresponding to the data transmission request exists is determined.

If the entry with VB=1 having the same BN does not exist, in step S305, one entry with OB=0 is selected, OB and VB are set to 1, the timer is started, BN and SVB are updated, the sector data is written into the entry, and the processing flow returns to step S301.

If the entry with VB=1 having the same BN exists, in step S306, the sector data is written into that entry, and SVB is updated.

In step S307, whether the full block is generated is determined.

If the full block is generated, in step S308, the timer is reset, VB is set to 0, the full block is transmitted to the FBB, and processing flow returns to step S301.

If the full block is not generated, in step S309, whether the timer of the entry is expired is determined.

If the timer of the entry is not yet expired, the processing flow returns to step S301.

If the timer of the entry is expired, in step S310, the timer is reset, VB is set to 0, entry data of a partial block is transmitted to the read-modify-write block, and the processing flow returns to step S301.

Figure 3B:
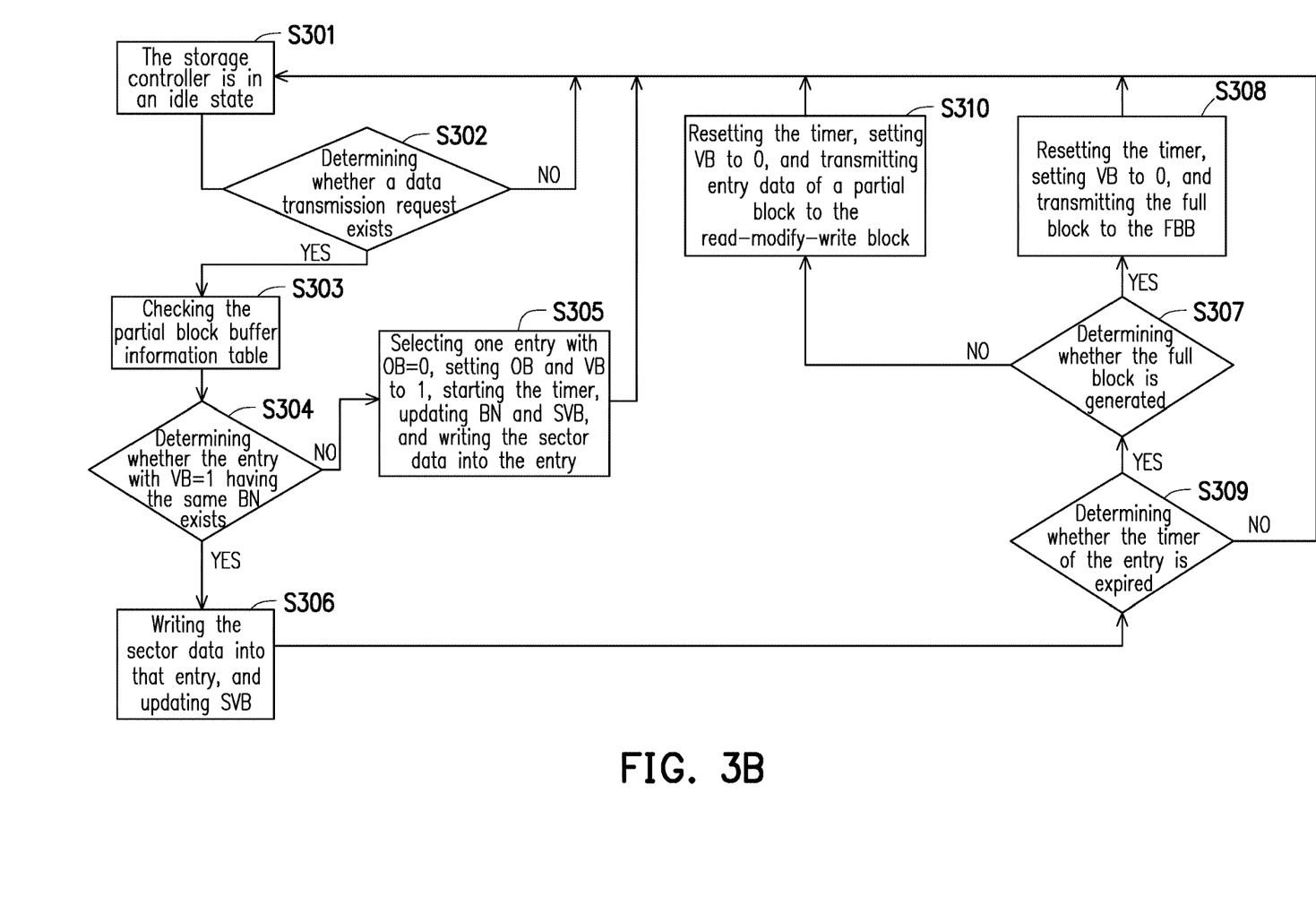
FIG. 3B is a flowchart of a processing flow of a partial block buffer according to another embodiment of the disclosure.

FIG. 3B is a flowchart of a processing flow of a partial block buffer according to another embodiment of the disclosure.

Each of steps S301 to S310 in FIG. 3B has the same content as the respective one of the steps S301 to S310 in FIG. 3A, but an executing sequence of steps S307 to S310 in FIG. 3B is different from an executing sequence of steps S307 to S310 in FIG. 3A. Specifically, in FIG. 3A, if the full block is generated (yes for S307) or the timer is expired (yes for S309), the PBB is released (i.e., the entry data of the PBB is transmitted to the FBB or the read-modify-write block). However, in FIG. 3B, the PBB is only released only when the timer is expired (yes for S309). In other words, in FIG. 3B, even if the full block is generated before the timer is expired, the PBB is temporarily not released, so that the sector data in the full block have the opportunity to be overwritten.

Figure 4:
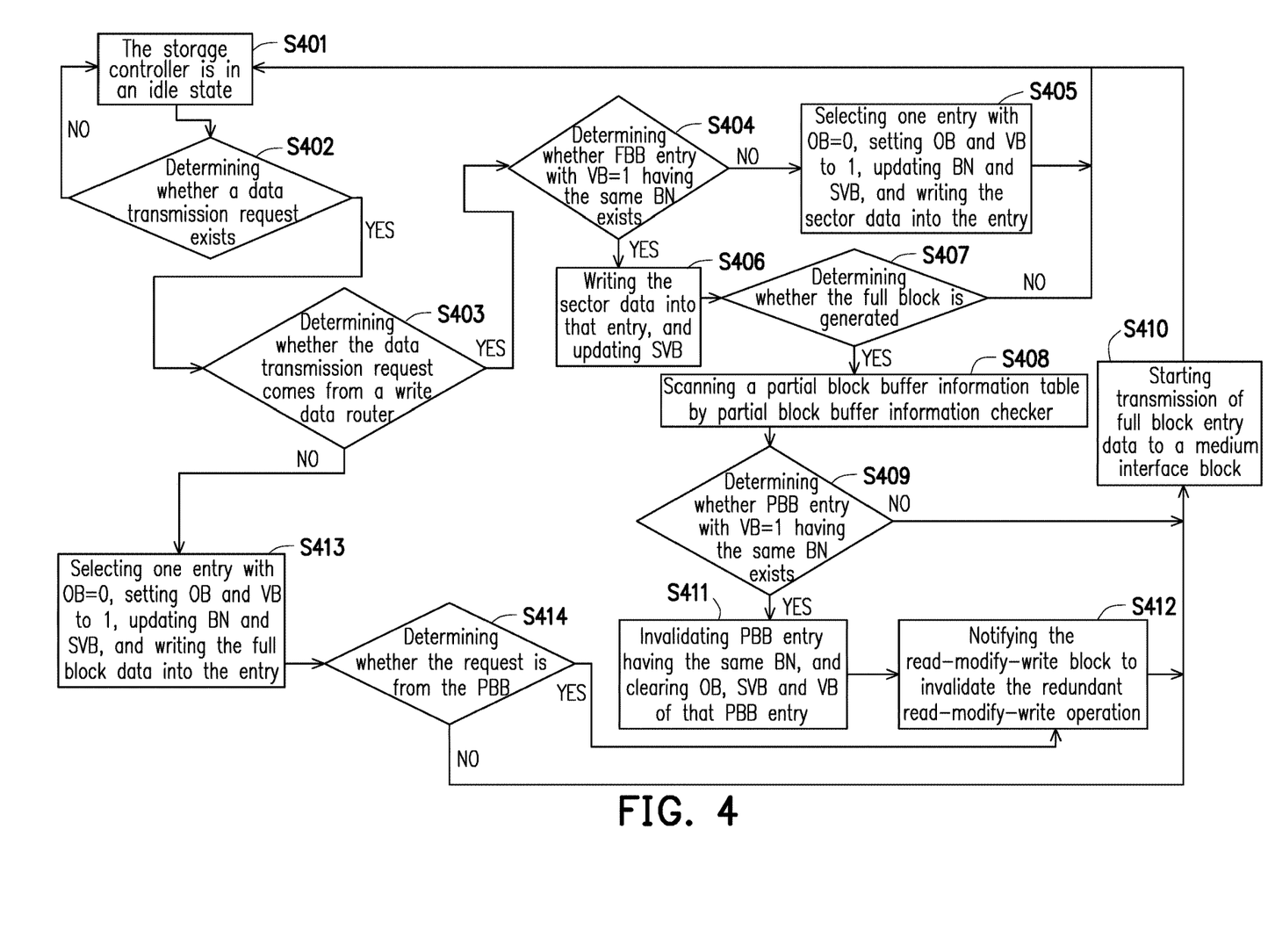
FIG. 4 is a flowchart of a processing flow of a full block buffer according to an embodiment of the disclosure.

FIG. 4 is a flowchart of a processing flow of a full block buffer according to an embodiment of the disclosure.

In step S401, a storage controller is in an idle state.

In step S402, whether a data transmission request exists is determined.

If the data transmission request does not exist, the processing flow returns to step S401. If the data transmission request exists, in step S403, determine whether the data transmission request comes from a write data router.

If the data transmission request comes from the write data router, in step S404, whether FBB entry with VB=1 having the same BN exists is determined. Specifically, whether FBB entry with VB=1 having the same BN of the write sectors corresponding to the data transmission request exists is determined.

If the entry with VB=1 having the same BN does not exist, in step S405, one entry with OB=0 is selected, OB and VB are set to 1, BN and SVB are updated, and the sector data is written into the entry.

If the entry with VB=1 having the same BN exists, in step S406, the sector data is written into that entry, and SVB is updated.

In step S407, whether a full block is generated is determined.

If the full block is generated, in step S408, a partial block buffer information checker scans a partial block buffer information table.

In step S409, whether PBB entry with VB=1 having the same BN exists is determined.

If the PBB entry with VB=1 having the same BN does not exist, in step S410, transmission of full block entry data to a medium interface block is started.

If PBB entry with VB=1 having the same BN exists, in step S411, PBB entry having the same BN is invalidated, and OB, SVB and VB of that PBB entry are cleared.

In step S412, the read-modify-write block is notified to invalidate the redundant read-modify-write operation. In other words, the read-modify-write operation for the write sectors having the same BN is invalidated.

In step S403, if the data transmission request is not from the write data router, in step S413, one entry with OB=0 is selected, OB and VB are set to 1, BN and SVB are updated, and the full block data is written into the entry.

In step S414, whether the request comes from the PBB is determined.

If the request is from the PBB, the processing flow proceeds to step S412.

If the request is not from the PBB, it means that the request is from the read-modify-write block, and the processing flow proceeds to step S410.

Figure 5A:
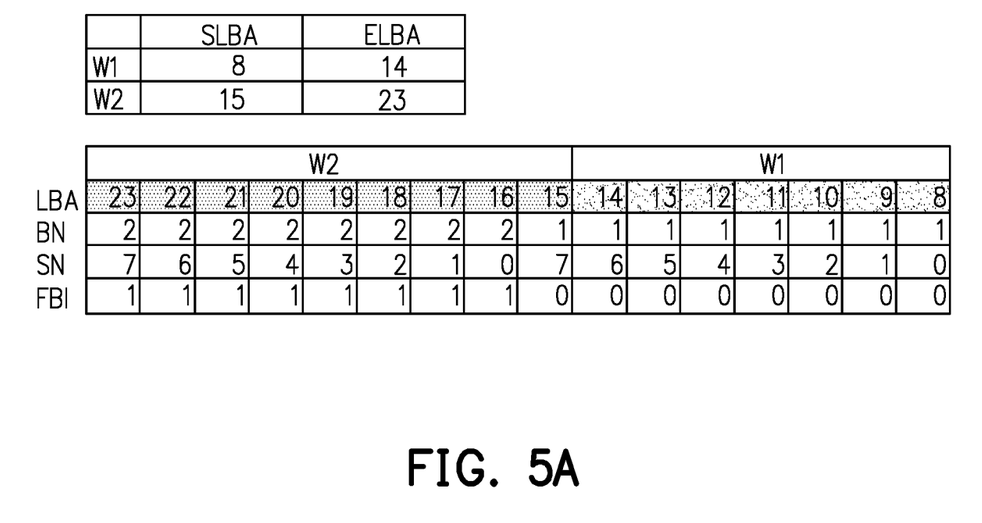
FIG. 5A and FIG. 5B illustrate an example of a data processing method according to an embodiment of the disclosure.
Figure 5B:
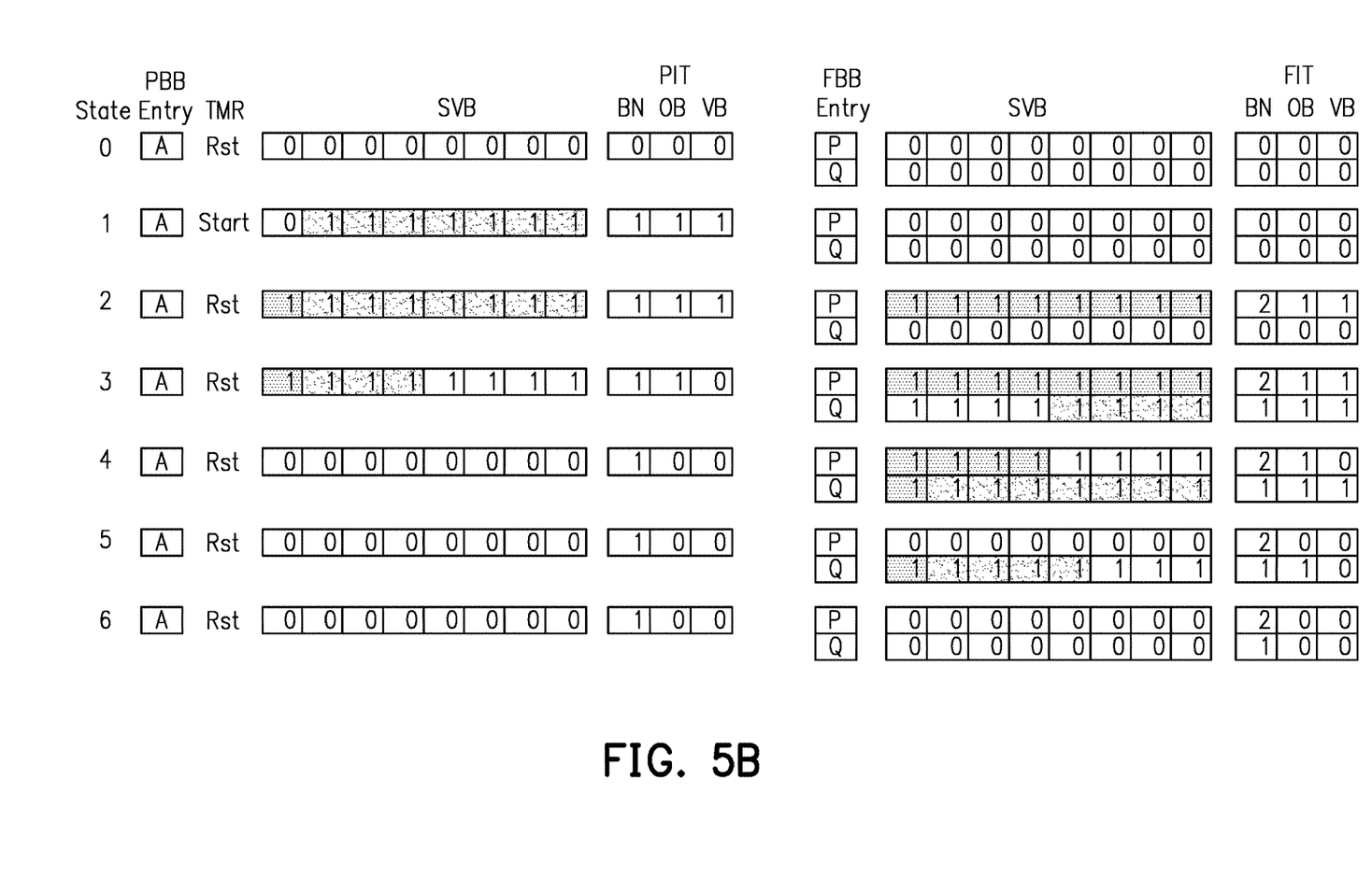

FIG. 5A and FIG. 5B illustrate an example of a data processing method according to an embodiment of the disclosure.

With reference to FIG. 5A and FIG. 5B, it is assumed that the block size is equal to eight times the sector size and the sector size is equal to the logic block address size.

FIG. 5A shows that the storage controller 210 receives write commands W1 and W2. SLBA (i.e., a starting LBA) and ELBA (i.e., an ending LBA) corresponding to W1 are 8 and 14, and SLBA and ELBA corresponding to W2 are 15 and 23. For W1, LBAs may be divided into 7 sectors, wherein BN is 1 and SN is 0 to 6. Since LBAs corresponding to W1 are unable to form one full block, FBIs are all set to 0. For W2, LBAs may be divided into 9 sectors, wherein LBA15 has BN being 1 and SN being 7, and the remaining LBAs have BN being 2 and SN being 0 to 7. Since LBA16 to LBA23 corresponding to W2 are able to form one full block, each of FBIs corresponding to LBA16 to LBA23 is set to 1.

In an initial state of FIG. 5B (i.e., State 0), fields of SVB and PIT of the PBB and SVB and FIT of the FBB are all 0.

In State 1, the write data router 245 assigns data of W1 to PBB entry A and updates PIT. A timer (TMR) is started (Start).

In State 2, PBB Entry A forms the full block, and thus the timer is reset (Rst). The write data router 245 assigns data of W2 to PBB Entry A and FBB entry P and updates FIT.

In State 3, because PBB Entry A forms the full block, data in PBB Entry A is transmitted to FBB entry Q. During the data transmission, VB of PBB Entry A is set to 0.

In State 4, data in FBB Entry P is transmitted to the medium interface block 260, and data in PBB Entry A has been transmitted to FBB Entry Q. Accordingly, VB of FBB Entry P is set to 0. OB of PBB entry A is set to 0 so as to indicate that PBB Entry A no longer includes the valid data.

In State 5, data in FBB Entry P has been transmitted to the medium interface block 260, and data in FBB Entry Q is transmitted to the medium interface block 260. Accordingly, OB of FBB Entry P is set to 0. VB of FBB Entry Q is set to 0.

In State 6, data in FBB Entry Q has been transmitted to the medium interface block 260. Accordingly, OB of FBB Entry Q is set to 0.

If the partial block buffer 251 and the full block buffer 252 are not adopted in this example, it is required to perform one read-modify-write operation per the operation of writing LBA8 to LBA14 of W1 and the operation of writing LBA15 of W2. However, in the case where the partial block buffer 251 and the full block buffer 252 are adopted, it is not necessary to perform the read-modify-write operation. In other words, the number of times that the read-modify-write operation is executed may be reduced from 2 times to 0 times.

Figure 6A:
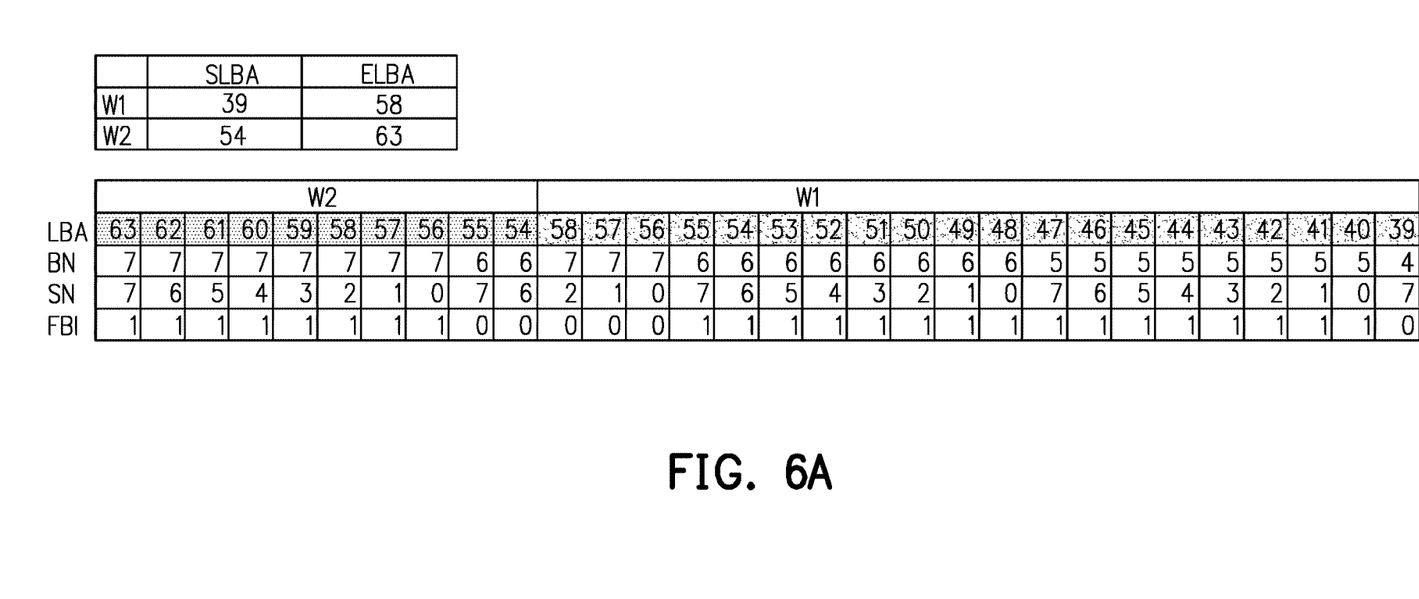
Figure 6C:
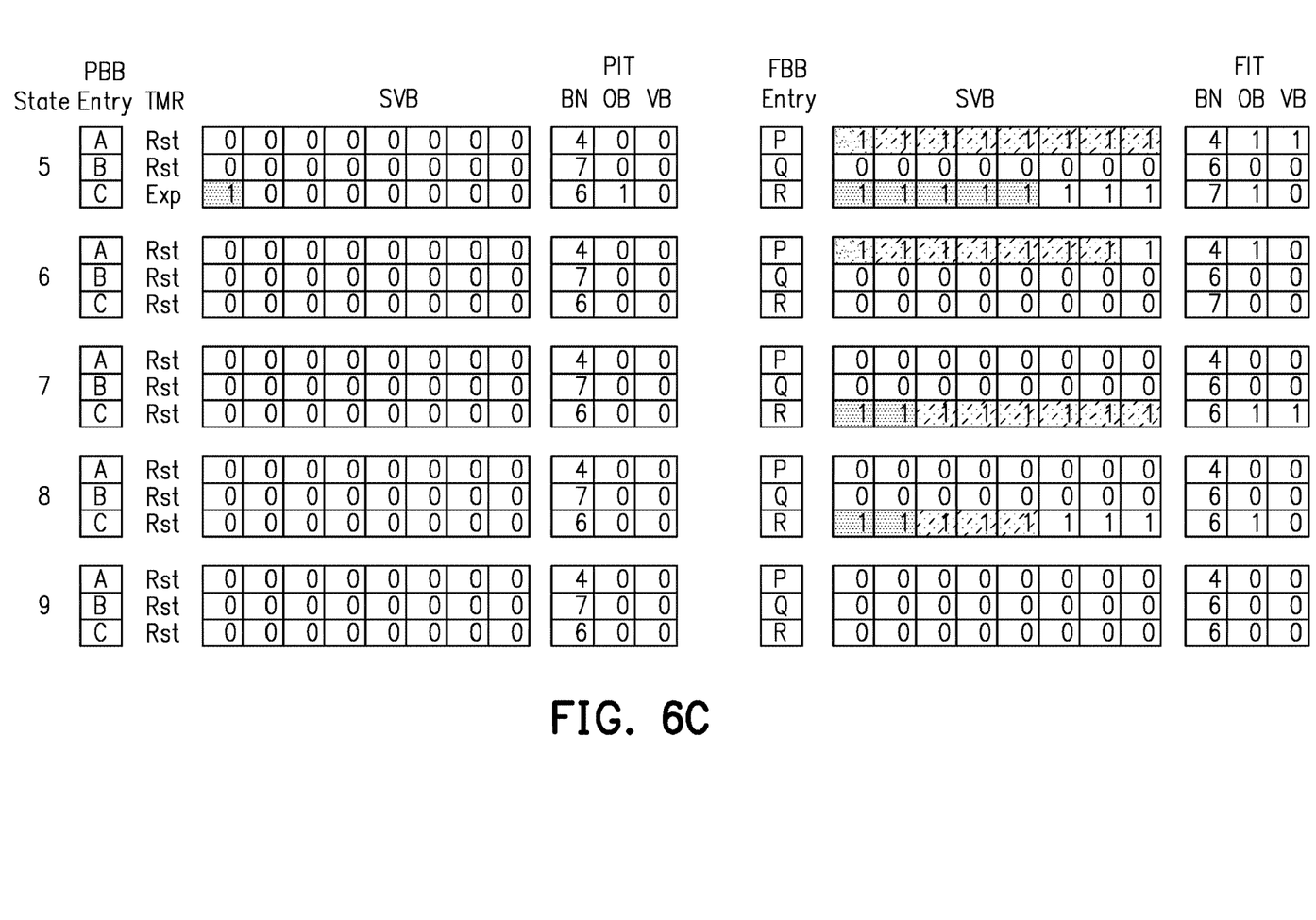

FIG. 6A to FIG. 6C illustrate another example of a data processing method according to an embodiment of the disclosure.

With reference to FIG. 6A to FIG. 6C, it is assumed that the block size is equal to eight times the sector size and the sector size is equal to the logic block address size. FIG. 6A shows that the storage controller 210 receives write commands W1 and W2. SLBA and ELBA corresponding to W1 are 39 and 58, and SLBA and ELBA corresponding to W2 are 54 and 63. Here, the method of filling up BN, SN, and FBI corresponding to each LBA is similar to the method of FIG. 5A, which is not repeated hereinafter.

In State 0, fields of SVB and PIT of the PBB and SVB and FIT of the FBB are all 0.

In State 1, the write data router 245 assigns data of W1 to PBB Entry A and PBB Entry B. The write data router 245 assigns data of W1 to FBB Entry P and FBB Entry Q. PIT and FIT are updated.

In State 2, the write data router 245 assigns data of W2 to PBB Entry C. The write data router 245 assigns data of W2 to FBB Entry R. Because the PIC 258 determines that BN of PBB Entry B is identical to BN of FBB Entry R, PBB Entry B is invalidated, the corresponding OB and VB is set to 0, and the corresponding timer is reset (Rst). It should be noted that, "Run" under the field of the timer (TMR) indicates that the timer is already started and is counting.

In State 3, data corresponding to BN 5 in FBB Entry P is transmitted to the medium interface block 260. Because the timer of PBB Entry A is expired (Exp), data corresponding to BN 4 in PBB Entry A is transmitted to the read-modify-write block 270. VB of PBB Entry A is set to 0 and VB of PBB Entry P is also set to 0.

In State 4, data corresponding to BN 4 in PBB Entry A has been transmitted to the read-modify-write block 270. Data corresponding to BN 5 in FBB Entry P has been transmitted to the medium interface block 260. Data in the FBB Entry Q is transmitted to the medium interface block 260. OB of PBB Entry A is set to 0 and the timer is reset.

In State 5, FBB Entry P receives data corresponding to BN 4 from the read-modify-write block 270. Data corresponding to BN 6 in FBB Entry Q has been transmitted to the medium interface block 260. Data corresponding to BN 7 in FBB entry R is transmitted to the medium interface block 260. Because the timer of PBB Entry C is expired, data corresponding to BN 6 in PBB Entry C is transmitted to the read-modify-write block 270.

In State 6, data corresponding to BN 6 in PBB Entry C has been transmitted to the read-modify-write block 270. Data corresponding to BN 7 in FBB Entry R has been transmitted to the medium interface block 260. Data corresponding to BN 4 in FBB entry P is transmitted to the medium interface block 260.

In State 7, data corresponding to BN 4 in FBB Entry P has been transmitted to the medium interface block 260. FBB Entry R receives data corresponding to BN 6 from the read-modify-write block 270.

In State 8, data corresponding to BN 6 in FBB Entry R is transmitted to the medium interface block 260.

In State 9, data corresponding to BN 6 in FBB Entry R has been transmitted to the medium interface block 260.

If the partial block buffer 251 and the full block buffer 252 are not adopted in this example, it is required to perform one read-modify-write operation per the operations of writing LBA39, and LBA56 to LBA58 of W1 as well as the operation of writing LBA54 to LBA55 of W2, that is, three read-modify-write operations in total. However, in the case where the partial block buffer 251 and the full block buffer 252 are adopted, it is only required to perform two read-modify-write operations (i.e., the read-modify-write operations performed for BN 4 and BN6). In other words, the number of times that the read-modify-write operation is executed may be reduced from 3 times to 2 times.

In summary, the data processing method and the storage controller using the method described in the disclosure can transmit the write sectors unable to form the full block to the partial block buffer, and can transmit the write sectors able to form the full block to the full block buffer. When the partial block is transmitted to the partial block buffer, the timer is started. When empty sectors in the entry corresponding to one block in the partial block buffer are filled before the timer is expired, the processor transmits the filled block to the full block buffer. When the entry corresponding to one block in the partial block buffer is not filled when the timer is expired, the processor performs the read-modify-write operation on the not-filled block. With the data processing method and the storage controller using the method described in the disclosure, the number of times that the read-modify-write operation is executed may be effectively reduced, so as to save system resources and improve system performance.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data processing method, associated with a storage controller, the storage controller being configured to access a storage medium and coupled to a host system, the data processing method comprising:

receiving a plurality of write sectors corresponding to a write command and transmitting the plurality of write sectors to a partial block buffer or a full block buffer, wherein the plurality of write sectors correspond to at least one block;

when the plurality of write sectors corresponding to a first block are transmitted to the partial block buffer, starting a timer when the first block is accessed;

when the partial block buffer receives at least one first write sector corresponding to the first block and the at least one first write sector and the plurality of write sectors corresponding to the first block in the partial block buffer form the full first block, transmitting the first block to the full block buffer from the partial block buffer before the timer is expired or when the timer is expired; and when the timer is expired and the full first block is not yet formed in the partial block buffer, performing a read-modify-write operation according to the plurality of write sectors corresponding to the first block.

2. The data processing method according to claim 1, wherein when the full block buffer receives the plurality of write sectors corresponding to a second block, the plurality of write sectors corresponding to the second block in the partial block buffer are invalidated.

3. The data processing method according to claim 1, wherein when full block buffer receives the plurality of write sectors corresponding to a second block, the read-modify-write operation corresponding to the second block is invalidated.

4. The data processing method according to claim 1, wherein when the plurality of write sectors are able to forth a full block, the plurality of write sectors are transmitted to the full block buffer; and when the write sectors are unable to form the full block, the plurality of write sectors are transmitted to the partial block buffer.

5. The data processing method according to claim 1, wherein the read-modify-write operation comprises obtaining at least one read sector from the storage medium, and transmitting the plurality of write sectors corresponding to the first block and the at least one read sector to the frill block buffer.

6. The data processing method according to claim 1, wherein when the at least one write sector and the plurality of write sectors corresponding to the first block in the partial block buffer form the frill first block, the timer is reset.

7. The data processing method according to claim 1, wherein when the timer is expired and the read-modify-write operation is performed according to the plurality of write sectors corresponding to the first block, the timer is reset.

8. The data processing method according to claim 1, wherein when the storage controller supports a plurality of logic block address sizes, a block size is equal to a common multiple of the logic block address sizes and a sector size is a common factor of the plurality of logic block address sizes.

9. The data processing method according to claim 1, wherein each of the full block buffer and the partial block buffer comprises a plurality of entries, a capacity of each of the plurality of entries is equal to a block size, and each of the plurality of entries of the partial block buffer corresponds to one said timer.

10. The data processing method according to claim 9, wherein when the plurality of write sectors are unable to form a full block and each of the plurality of entries of the partial block buffer has valid data, a first entry among the plurality of entries of the partial block buffer with the timer closest to being expired is selected for performing the read-modify-write operation and the first entry is invalidated.

11. The data processing method according to claim 1, wherein when the full first block is formed before the timers expired and a second write sector corresponding to the first block is received by the partial block buffer before the timer is expired, the second write sector is overwritten to the full first block in the partial block buffer.

12. A storage controller, configured to access a rewritable non-volatile memory module and coupled to a host system, the storage controller comprising:
a partial block buffer;
a full block buffer;
a write data router, coupled to the partial block buffer and the full block buffer; and
a processor, coupled to the write data router, the partial block buffer and the full block buffer, wherein
the write data router receives a plurality of write sectors corresponding to a write command and transmits the plurality of write sectors to a partial block buffer or a full block buffer, wherein the plurality of write sectors correspond to at least one block; when the plurality of write sectors corresponding to a first block are transmitted to the partial block buffer, the processor starts a timer when the first block is accessed;
when the partial block buffer receives at least one first write sector corresponding to the first block and the at least one first write sector and the plurality of write sectors corresponding to the first block in the partial block buffer form the full first block, the first block is transmitted to the full block buffer from the partial block buffer before the timer is expired or when the timer is expired; and
when the timer is expired and the full first block is not yet formed in the partial block buffer, the processor performs a read-modify-write operation according to the plurality of write sectors corresponding to the first block.

13. The storage controller according to claim 12, wherein when the full block buffer receives the plurality of write sectors corresponding to a second block, the plurality of write sectors corresponding to the second block in the partial block buffer are invalidated.

14. The storage controller according to claim 12, wherein when the full block buffer receives the plurality of write sectors corresponding to a second block, the read-modify-write operation corresponding to the second block is invalidated.

15. The storage controller according to claim 12, wherein when the plurality of write sectors are able to form a full block, the plurality of write sectors are transmitted to the full block buffer; and when the plurality of write sectors are unable to form the full block, the plurality of write sectors are transmitted to the partial block buffer.

16. The storage controller according to claim 12, wherein the read-modify-write operation comprises obtaining at least one read sector from the storage medium, and transmitting the plurality of write sectors corresponding to the first block and the at least one read sector to the full block buffer.

17. The storage controller according to claim 12, wherein when the at least one write sector and the plurality of write sectors corresponding to the first block in the partial block buffer form the full first block, the timer is reset.

18. The storage controller according to claim 12, wherein when the timer is expired and the read-modify-write operation is performed according to the plurality of write sectors corresponding to the first block, the timer is reset.

19. The storage controller according to claim 12, wherein when the storage controller supports a plurality of logic block address sizes, a block size is equal to a common multiple of the logic block address sizes and a sector size is a common factor of the plurality of logic block address sizes.

20. The storage controller according to claim 12, wherein each of the full block buffer and the partial block buffer comprises a plurality of entries, and a capacity of each of the plurality of entries is equal to a block size and each of the plurality of entries of the partial block buffer corresponds to the timer.

21. The storage controller according to claim 20, wherein when the plurality of write sectors are unable to form a full block and each of the plurality of entries of the partial block buffer has valid data, the processor selects a first entry among the plurality of entries of the partial block buffer with the timer closest to being expired for performing the read-modify-write operation and invalidates the first entry.

22. The storage controller according to claim 12, wherein when the full first block is formed before the timer is expired and a second write sector corresponding to the first block is received by the partial block buffer before the timer is expired, the processor overwrites the second write sector to the full first block in the partial block buffer.

* * * * *